(12) United States Patent
Cho et al.

(10) Patent No.: US 8,004,787 B2
(45) Date of Patent: Aug. 23, 2011

(54) METHOD AND SYSTEM FOR SERVO TRACK WRITE

(75) Inventors: Kyu Nam Cho, Seoul (KR); Kwang Jo Jung, Suwon-si (KR); Jong Ryul Kim, Gumi-si (KR); Myoung Joo Na, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 12/354,866

(22) Filed: Jan. 16, 2009

(65) Prior Publication Data
US 2009/0185305 A1 Jul. 23, 2009

(30) Foreign Application Priority Data

Jan. 22, 2008 (KR) .................. 10-2008-0006802

(51) Int. Cl.
*G11B 21/12* (2006.01)
(52) U.S. Cl. ........................................... 360/75
(58) Field of Classification Search ................ None
See application file for complete search history.

(56) References Cited

U.S. PATENT DOCUMENTS

| | | | | |
|---|---|---|---|---|
| 5,485,322 A * | 1/1996 | Chainer et al. | .................. | 360/75 |
| 6,064,541 A * | 5/2000 | Sasamoto et al. | .......... | 360/77.05 |
| 6,304,407 B1 * | 10/2001 | Baker et al. | ..................... | 360/75 |
| 6,704,156 B1 * | 3/2004 | Baker et al. | ..................... | 360/75 |
| 6,724,558 B2 * | 4/2004 | Bryant et al. | .................. | 360/75 |
| 7,006,322 B2 * | 2/2006 | Sado | .............................. | 360/75 |
| 7,116,510 B2 * | 10/2006 | Yamamoto | ..................... | 360/75 |
| 7,218,471 B2 * | 5/2007 | Meyer | ............................. | 360/75 |
| 7,511,912 B2 * | 3/2009 | Wilson et al. | .................. | 360/75 |
| 2004/0264031 A1 * | 12/2004 | Yatsu | ............................. | 360/75 |
| 2006/0109583 A1 * | 5/2006 | Sado et al. | ..................... | 360/75 |
| 2006/0126203 A1 | 6/2006 | Kisaka | | |
| 2007/0047132 A1 * | 3/2007 | Sado et al. | ................. | 360/77.01 |
| 2007/0159711 A1 * | 7/2007 | Dunn | ............................ | 360/75 |
| 2009/0168226 A1 * | 7/2009 | Herbst et al. | ............... | 360/77.04 |
| 2010/0149678 A1 * | 6/2010 | Huang et al. | ..................... | 360/66 |

FOREIGN PATENT DOCUMENTS

| | | |
|---|---|---|
| JP | 20040014010 | 1/2004 |
| KR | 1019990065657 | 8/1999 |
| KR | 1020040045640 | 6/2004 |

* cited by examiner

*Primary Examiner* — Hoa T Nguyen
*Assistant Examiner* — James L Habermehl
(74) *Attorney, Agent, or Firm* — Stanzione & Kim, LLP

(57) ABSTRACT

A servo track writing method and a servo track write system of a hard disk drive (HDD) using the servo track write method. The servo track writing method includes performing a reference check (R/C) on a first servo pattern which is pre-written on a first surface of a disk, and if the R/C determines that a quality of the first servo pattern is not good, erasing a specific area of the first servo pattern and writing a second servo pattern on a second surface of the disk. Therefore, process time delay factors of a series of rework processes of writing servo patterns on a disk are removed to shorten a process time of the rework processes. In addition, productivity of a HDD is improved.

27 Claims, 8 Drawing Sheets

METHOD AND SYSTEM FOR SERVO TRACK WRITE

CROSS-REFERENCE TO RELATED APPLICATIONS

This application claims priority under 35 U.S.C 119(a) from Korean Patent Application No. 10-2008-0006802, filed on Jan. 22, 2008, in the Korean Intellectual Property Office, the disclosure of which is incorporated herein in its entirety by reference.

BACKGROUND OF THE INVENTION

1. Field of the Invention

The present general inventive concept relates to a servo track writing method and a servo track write system of a hard disk drive (HDD) using the servo track writing method, and more particularly, to a servo track writing method of removing process time delay factors of a series of rework processes of writing servo patterns on a disk in order to shorten a process time of the rework processes and improving productivity of a HDD, and a servo track write system of the HDD using the servo track write method.

2. Description of the Related Art

Hard disk drives (HDDs) record data on and/or reproduce data from disks using heads to contribute to operations of computer systems.

Bits per inch (BPI) and tracks per inch (TPI) of disks in present HDDs have been increased. BPI indicates densities in rotation directions of the disks, and the TPI indicates densities in radius directions of the disks. The size of disks in such HDDs have been decreased, while capacities and densities of disks have been increased. Therefore, more sophisticated mechanisms are required for reading and writing information to the disks of the HDD.

A HDD requires servo information to control a position of a head on a magnetic disk so as to read data from and/or write data on the magnetic disk in a desired position.

Writing of such servo information on a disk refers to servo track write.

A servo track write is greatly classified into Conventional Servo Track Write (CSTW) and Offline Servo Track Write (OLSTW).

The CSTW is to permanently write servo information on a disk using a predetermined servo writer after a HDD is assembled.

In the CSTW, after a head disk assembly (HDA) is assembled, the servo information is written. Thus, the servo information is written based on a spindle motor. Accordingly, rotation tracks, which are made by a head along the servo information, are hardly different from substantial rotation tracks of the disk.

However, since the servo information is written after the HDA is assembled, a large amount of time is required to write the servo information. In particular, the number of tracks is increased with an increase in recording density of a HDD. Therefore, the time required for performing a process of writing the servo information on the disk is gradually increased in contradistinction of the whole process.

Differently from the CSTW, the OLSTW is to load a disk, on which servo information has been already written, into a HDD.

In the OLSTW, several disks are stacked, and then servo patterns necessary for servo information are pre-written on the stacked disks. If the OLSTW is used, servo patterns are generally written only on a side of a disk, i.e., a first surface of the disk which is a lower surface of the disk.

For reference, data and servo patterns may be written on both sides of a disk. Those of ordinary skill in the art generally refer to a head, which is disposed on a first surface to read and write information, as #0 head and to a head, which is disposed on a second surface to read and write information, as #1 head. Here, the first surface is a lower surface of the disk, and the second surface is an upper surface of the disk. Hereinafter, for convenience, #0 head and #1 head will be referred to as first and second heads, respectively.

Disks, having first surfaces only on which servo patterns have been written using OLSTW as described above, are assembled with a HDD and then experience a reference check (R/C) process.

Qualities of the servo patterns are first checked through the R/C process. Here, if the qualities of the servo patterns are not good or defective, servo patterns are re-written by an additional servo writer in rework processes.

If the servo patterns are to be re-written in the rework processes due to the defective states of the qualities of the servo patterns, pre-written servo patterns must be erased.

A work of erasing the servo patterns is generally performed by a magnet eraser.

However, since the magnet eraser has a structure in which an erase head is disposed only on an upper surface of a disk on which a second head is positioned, the magnet eraser substantially erase only servo patterns written on the upper surface of the disk.

Accordingly, if servo patterns of an object to be erased are written on a lower surface of a disk on which a first head is disposed, the magnet eraser may not be used.

In this case, existing servo patterns are erased and new servo patterns are written using a servo writer which adopts Push Pin Type Servo Track Write (PPTSTW). The PPTSTW is to erase servo patterns, which are pre-written in all tracks of a disk, one by one and write new servo patterns.

As described above, the servo writer using the PPTSTW erases the servo patterns written in the all tracks of the disk, moving each one of the tracks of the disk and then re-writes servo patterns. Therefore, a process time required for erasing the pre-written servo patterns one by one is unnecessarily increased, and thus rework processes are delayed. As a result, a process time of the rework processes is increased, and manufacturing cost of a HDD is increased.

In particular, rework processes are increased in the case of a HDD having high TPI. This is a factor of lowering productivity of the HDD.

SUMMARY OF THE INVENTION

The present general inventive concept provides a servo track write method of removing process time delay factors of a series of rework processes of writing servo patterns on a disk in order to shorten a process time of the rework processes and improving productivity of a hard disk drive (HDD), and a servo track write system of the HDD using the servo track write method.

Additional aspects and utilities of the present general inventive concept will be set forth in part in the description which follows and, in part, will be obvious from the description, or may be learned by practice of the general inventive concept.

The foregoing and/or other aspects of the general inventive concept may be achieved by providing a servo track writing method including performing a reference check (R/C) on a first servo pattern which is pre-written on a first surface of a disk, and if the performed R/C that a quality of the first servo pattern is not good, erasing a specific area of the first servo pattern and writing a second servo pattern on a second surface of the disk.

The servo track writing method may further include determining a reference head which is to be a reference for a R/C performed on the second servo patterns.

The determination of the reference head may include selecting a first head of first and second heads corresponding to the first surface of the disk as a first reference head, performing a ready operation of the first reference head, and determining a final reference head based at least in part on whether the ready operation of the first reference head is normally performed.

The determination of the reference head may further include repeating the ready operation of the first reference head a predetermined reference number of times, if the ready operation of the first reference head is not normally performed.

The determination of the reference head may further include if the number of repetitions of the ready operation of the first reference head exceeds a predetermined reference number of times, selecting the second head as a second reference head and performing a ready operation of the second reference head.

The second servo pattern may be a servo pattern which is newly written throughout the second surface of the disk.

The servo track writing method may further include performing the R/C process on the servo pattern which is written on the second surface of the disk.

The servo track writing method may also include if a quality of the second servo pattern is good as determined by the performed R/C, copying the second servo pattern onto the first surface of the disk. If the quality of the second servo pattern is not good as determined by the performed R/C, erasing a portion of the second servo pattern using a predetermined magnet eraser and writing a new servo pattern on the second surface of the disk.

The servo track writing method may include where the first servo pattern may be pre-written on the first surface of the disk using Offline Servo Track Write (OLSTW).

The servo track writing method may also include where the specific area is a servo pattern which is positioned in an outer diameter (OD) area of the first surface of the disk.

The foregoing and/or other aspects of the general inventive concept may also be achieved by providing a servo track write system of a hard disk drive (HDD) including a servo writer connected to the HDD to pre-write a first servo pattern on a disk of the HDD, and a system controller to perform a reference check (R/C) on the first servo pattern, to erase a specific area of the first servo pattern, and to write a second servo pattern on a second surface of the disk if the R/C check determines that the first servo pattern is not good.

The system controller may determine a reference head which is a reference for the R/C to be performed on the second servo pattern.

The system controller may be to select a first head corresponding to the first surface of the disk as a first reference head from first and second heads, to perform a ready operation of the first reference head, and to determine a final reference head based on whether the ready operation of the first reference head is normally performed.

If the ready operation of the first reference head is normally performed, the system controller may repeat the ready operation of the first reference head a predetermined reference number of times.

If the number of repetitions of the ready operation of the first reference head exceeds the predetermined reference number of times, the system controller may select the second head as a second reference head and perform a ready operation on the second reference head.

The second servo pattern to be written by the system controller may be a servo pattern which is newly written throughout the second surface of the disk.

The system controller may be to perform the R/C on the second servo pattern which is written on the second surface of the disk.

If a quality of the second servo pattern is good, the system controller may copy the second servo pattern onto the first surface of the disk. If the quality of the second servo pattern is not good, the system controller may erase a whole portion of the second servo pattern and write a new servo pattern on the second surface of the disk using a predetermined magnet eraser.

The first and second surfaces may be respectively lower and upper surfaces of a disk. The system controller may write the first servo pattern on the first surface of the disk using OLSTW. The servo writer may by a Push Pin Type Servo Track Writer (PPTSTW).

The specific area that is erased by the system controller may be a servo pattern which is positioned in an OD area of the first surface of the disk.

The foregoing and/or other aspect and utilities of the present general inventive concept may also be achieved by providing a servo track writing method, including determining a quality of a first servo pattern pre-written on a first surface of a disk, comparing the determined quality with a predefined quality level, and erasing a specific area of the first servo pattern and writing a second servo pattern on a second surface of the disk if the determined quality is less than the predefined quality level.

The method may further include determining a reference head, and determining a quality of a second servo pattern written on the second surface of the disk.

The foregoing and/or other aspect and utilities of the present general inventive concept may also be achieved by providing a servo track write system of a hard disk drive (HDD), including a servo writer connected to the HDD to pre-write a first servo pattern on a disk of the HDD, a system controller to determine a quality of the first servo pattern pre-written on a first surface of a disk, to compare the determined quality with a predefined quality level, and to erase a specific area of the first servo pattern and write a second servo pattern on a second surface of the disk if the determined quality is less than the predefined quality level.

The system may further include that the system controller is to determine a reference head and determine a quality of a second servo pattern written on the second surface of the disk.

The foregoing and/or other aspect and utilities of the present general inventive concept may also be achieved by providing a hard disk drive (HDD) apparatus, including at least one disk, and a controller to control a received pre-write operation of a first servo pattern on the at least one disk, and to control an erase operation of a specific area of the first servo pattern and to control a write operation of a second servo pattern on a second surface of the at least one disk if a received quality determination of the pre-written first servo pattern is less than a predefined quality level.

The foregoing and/or other aspect and utilities of the present general inventive concept may also be achieved by providing a hard disk drive (HDD) system, including at least one disk, a HDD controller to control a write operation of data on the at least one disk, a servo writer connected to the HDD controller to pre-write a first servo pattern on the at least one disk, and a system controller to determine a quality of the first servo pattern pre-written on a first surface of the at least one disk, to compare the determined quality with a predefined quality level, and to erase a specific area of the first servo pattern and write a second servo pattern on a second surface of the at least one disk if the determined quality is less than the predefined quality level.

In the present general inventive concept, process time delay factors of a series of rework processes of writing servo patterns on a disk may be removed to shorten a process time of the rework processes. In addition, productivity of a HDD may be improved.

BRIEF DESCRIPTION OF THE DRAWINGS

The above and/or other aspects and advantages of the present general inventive concept will become apparent and more readily appreciated from the following detailed description, taken in conjunction with the accompanying drawings of which.

DETAILED DESCRIPTION OF THE PREFERRED EMBODIMENTS

Figure 1:
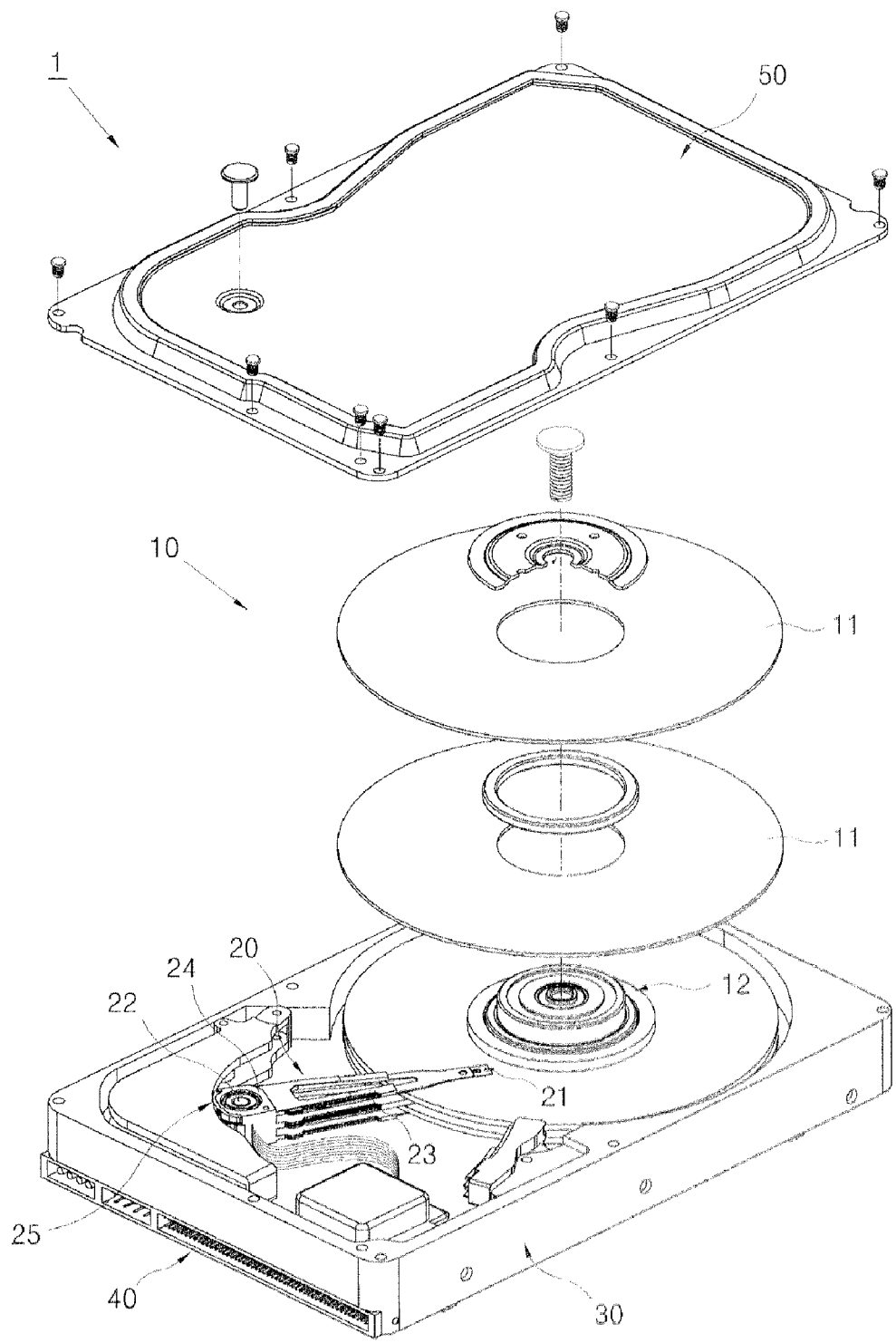
FIG. 1 is an exploded perspective view of a hard disk drive (HDD) using a servo track write system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is an exploded perspective view of a hard disk drive (HDD) using a servo track write system according to an embodiment of the present general inventive concept. Referring to FIG. 1, a HDD 1 includes a disk 11, a disk pack 10, a head stack assembly (HSA) 20, a base 30, a printed circuit board assembly (PCBA) 40, and a cover 50. Data is written and stored on the disk 11. The disk pack 10 includes a spindle motor 12 which supports and rotates the disk 11. The HSA 20 reads the data from the disk 11. Parts including the disk 11, the disk pack 10, and the HSA 20 are assembled on the base 30. The PCBA 40 is combined with a lower portion of the base 30 to install most of circuit parts on a printed circuit board (PCB) so as to control various types of parts. The cover 50 covers an upper portion of the base 30.

The HSA 20 is a carriage which writes data on and/or reads data from the disk 11 and includes a head 21, an actuator arm 23, a pivot shaft holder 24, and a bobbin (not illustrated). The head 21 is to write data on and/or read data from the disk 11. The actuator arm 23 pivots above the disk 11 on a pivot shaft 22 so that the head 21 accesses the data written on the disk 11. The pivot shaft holder 24 supports the pivot shaft 22 so that the pivot shaft 22 pivots, and is combined with the actuator arm 23 to support the actuator arm 23. The bobbin is provided at the pivot shaft holder 24 to be opposite to the actuator arm 23. Also, a voice coil (not illustrated) is turned on the bobbin so that the bobbin is positioned between magnets of a voice coil motor (VCM) 25.

The head 21 senses a magnetic field formed on a surface of the disk 11 or magnetizes the surface of the disk 11 to read data from and/or write data on the disk 11 which is rotating. The head 21 is classified into a read head which reads data from tracks and a write head which writes data in the tracks.

The VCM 25 is a kind of driving motor which pivots the actuator arm 23 to move the head 21 to a desired position of the disk 11. The VCM 25 uses Fleming's left hand rule, i.e., a principle of generating a force when current flows in a conductor positioned in a magnetic field. Thus, the VCM 25 applies current to the voice coil positioned between the magnets to apply a force to the bobbin so as to rotate the bobbin. Therefore, the actuator arm 23, which extends from the pivot shaft holder 24 to be opposite to the bobbin, pivots. As a result, the head 21, which is supported at an end of the actuator arm 23, moves in a radius direction on the disk 11, which is rotating, to seek tracks so as to access information. Next, the head 21 processes the accessed information as a signal.

Figure 2:
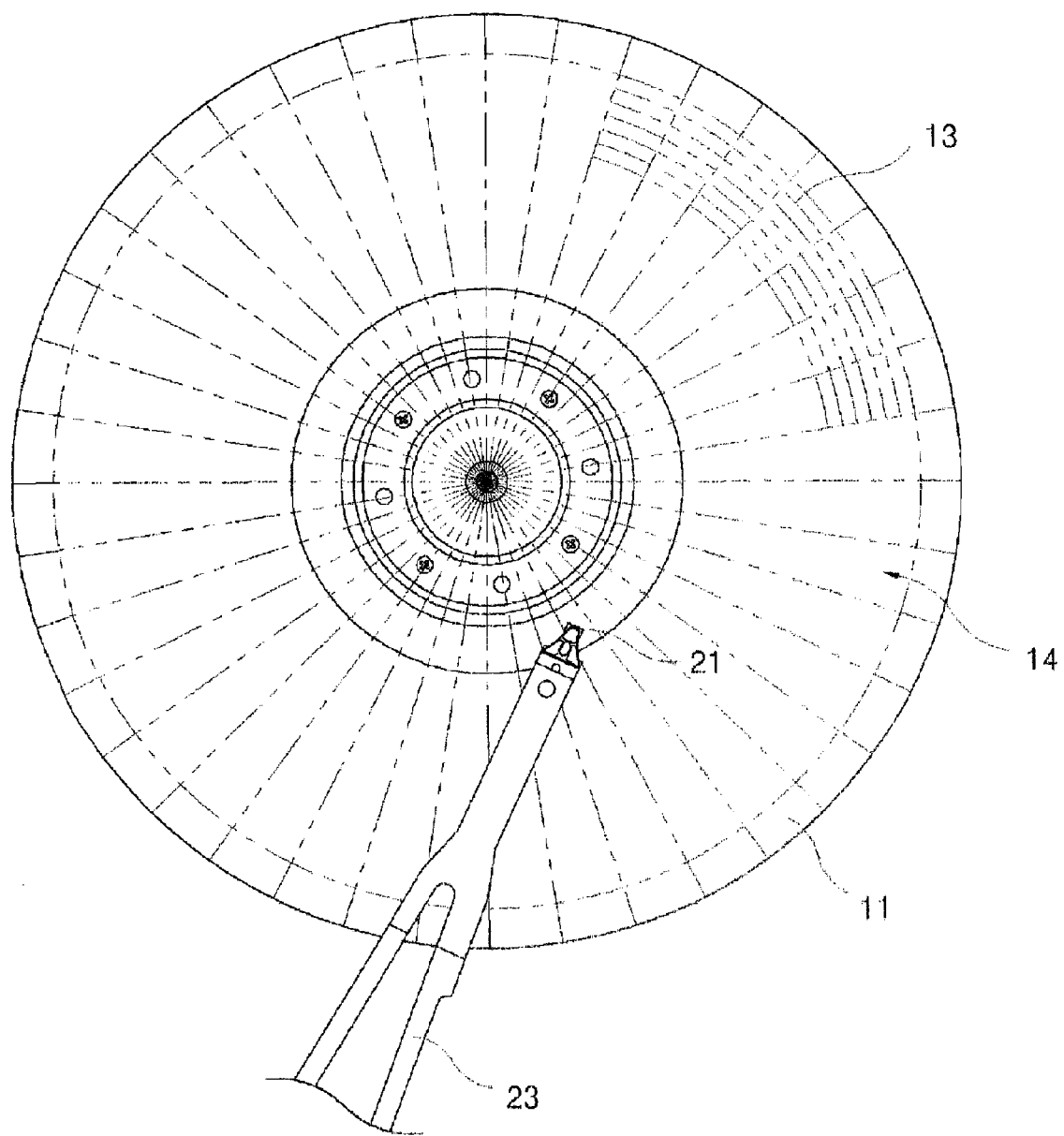
FIG. 2 is a schematic plan view of a disk zone, according to an embodiment of the present general inventive concept.
Figure 3:
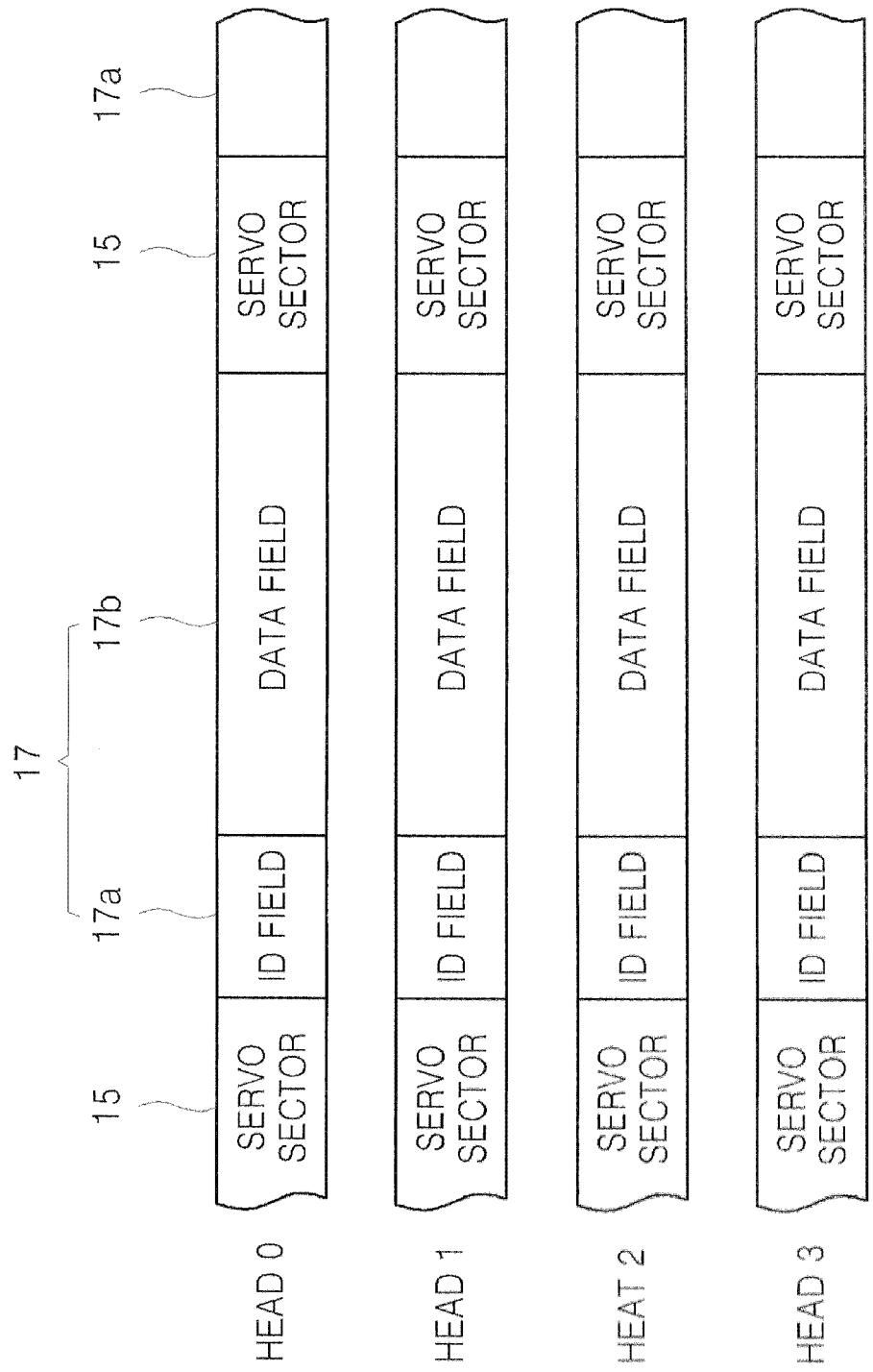
FIG. 3 illustrates a data format of each track of a HDD, according to an embodiment of the present general inventive concept.
Figure 4:
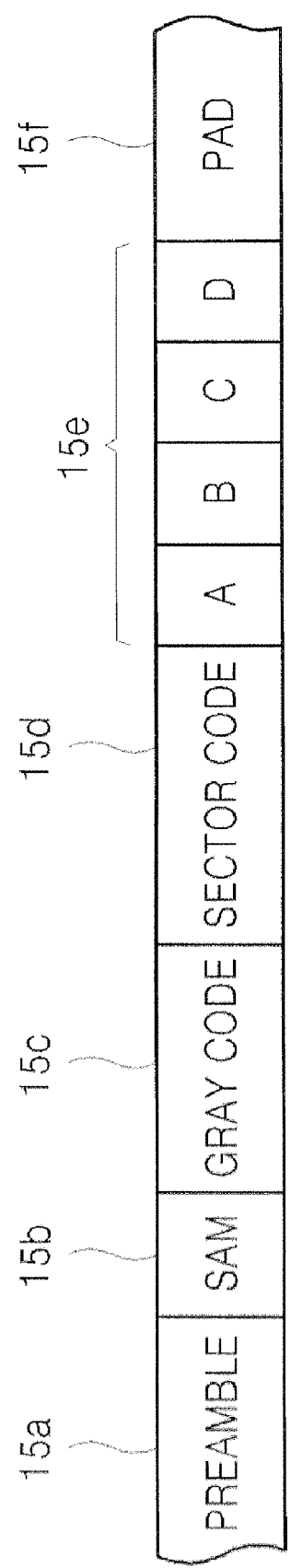
FIG. 4 illustrates a detailed format of a servo sector of a HDD, according to an embodiment of the present general inventive concept.

FIG. 2 is a schematic plan view of a disk zone according to an embodiment of the present general inventive concept. FIG. 3 illustrates a data format of each track, according to an embodiment of the present general inventive concept. FIG. 4 illustrates a detailed format of a servo sector, according to an embodiment of the present general inventive concept.

As illustrated in FIG. 2, the disk 11, on which the data is written and stored, includes tracks 13 and sectors 14. The tracks 13 are objects which store servo information and data information, and the sectors 14 are unit objects into which the tracks 14 are divided at equiangular intervals based on a rotation shaft.

As illustrated in FIG. 3, servo sectors 15 alternate with data sectors 17 in each of the tracks 13 (e.g., illustrated in FIG. 2). The servo sectors 15 are necessary for servo controls including track seeking, track following, etc., and user data is written in the data sectors 17.

As illustrated in FIG. 4, each of the servo sectors 15 (e.g., illustrated in FIG. 3) includes a preamble 15a, a servo address mark (SAM) 15b, a gray code 15c, a sector code 15d, bursts 15e (e.g., bursts A, B, C, and D), and a PAD 15f.

The preamble 15a is referred to as a servo sync which synchronizes clocks when servo information is read and which provides a gap in front of a servo sector to indicate the servo sector. The SAM 15b signifies the start of servo to provide sync for reading the gray code 15c. In other words, the SAM 15b is provided as a datum for generating various types of timing pulses related to the servo controls. The gray code 15c provides information about each of the tracks 13, i.e., track information. The sector code 15d provides the number of sectors. The bursts 15e (e.g., bursts A, B, C and D) provide a position error signal (PES) required for track seeking and track following. The PAD 15f provides a transition margin from a servo sector to a data sector.

The data sectors 17 are positioned after and before the servo sectors 15 and are divided into identification (ID) fields 17a and data fields 17b.

Header information is written in the ID fields 17a to identify corresponding data sectors. Digital data that a user desires to write is written in the data fields 17b.

Figure 5:
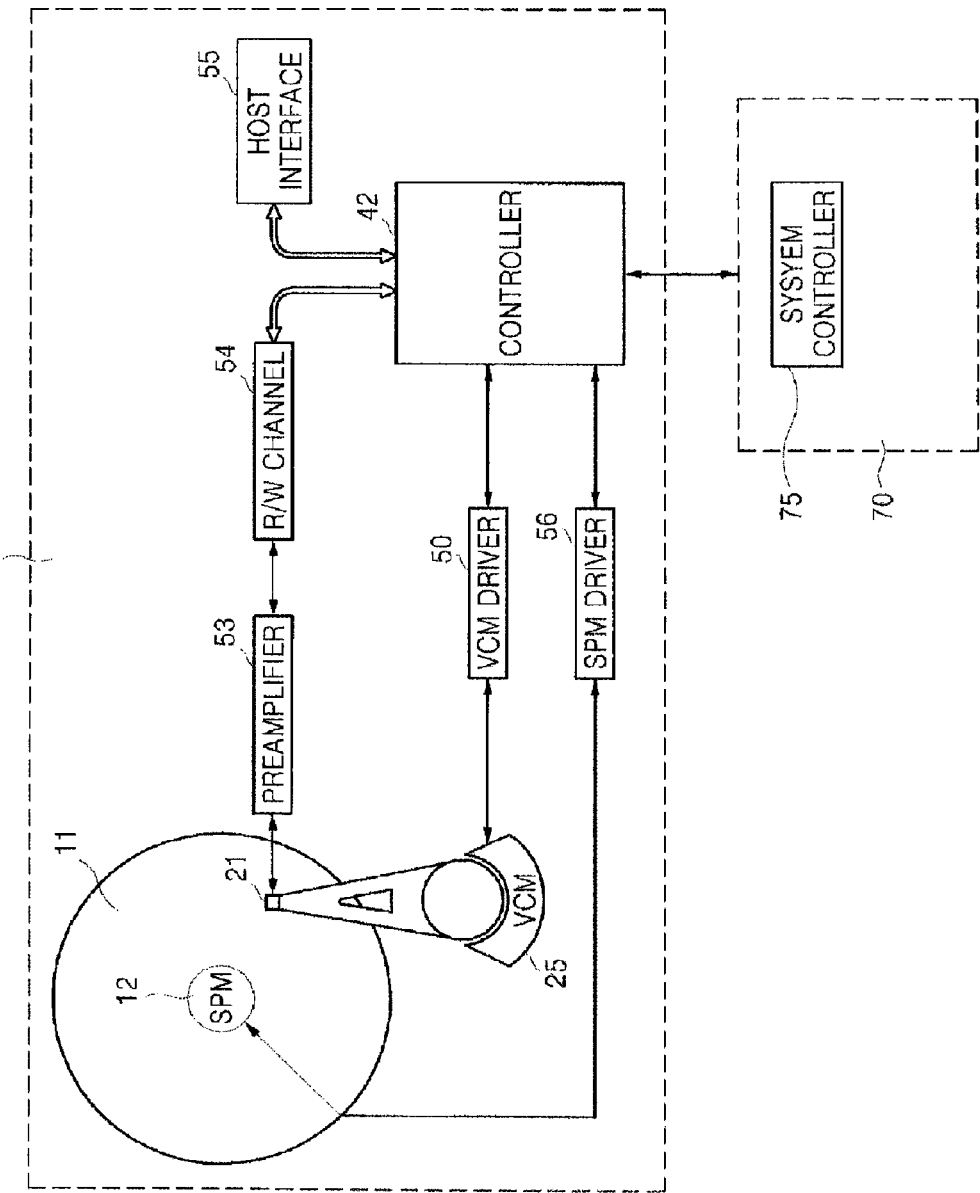
FIG. 5 is a schematic block diagram illustrating a servo track write system of a HDD according to an embodiment of the present general inventive concept.

FIG. 5 illustrates a schematic block diagram of a system to write a servo track on the HDD 1, according to an embodiment of the present general inventive concept.

Referring to FIG. 5, the HDD 1 includes a preamplifier 53, a read/write (R/W) channel 54, a host interface 55, a VCM driver 50, a spindle motor (SPM) driver 56, and a controller 42 which controls the preamplifier 53, the R/W channel 54, the host interface 55, the VCM driver 50, and the SPM driver 56.

The preamplifier 53 amplifies a data signal, which has been reproduced from the disk 11 by the head 21, or a write current, which has been converted by the R/W channel 54, and then writes the amplified data signal or write current on the disk 11 using the head 21.

The R/W channel 54 converts the data signal, which has been amplified by the preamplifier 53, into a digital signal and transmits the digital signal to a host device (not illustrated) through the host interface 55. Alternatively, the R/W channel 54 receives data, which is input by a user, through the host interface 55, transforms the data into a binary data stream, which is to be easily written, and inputs the binary data stream into the preamplifier 53.

The host interface 55 transmits the data signal, which has been converted into the digital signal, to the host device or receives the data input by the user from the host device and inputs the data into the R/W channel 54 through the controller 42.

The VCM driver 50 receives a control signal from the controller 42 to control an amount of current which is applied to the VCM 25. The SPM driver 56 receives the control signal from the controller 42 to control an amount of current which is applied to the spindle motor 12.

The system further includes a servo track writer 70 having a system controller 75 connected to the HDD1. The servo track writer 70 may be a computer, a data processing apparatus, a digital multimedia device, any other suitable system or apparatus, etc. connected to the HDD 1 to write data on the HDD 1 and to read data from the HDD 1, and also write a servo track on to the disk 10 of the HDD 1. The servo track writer 70 can be connected to the controller 42 of the HDD 1 through a wired or wireless communication line.

Figure 6:
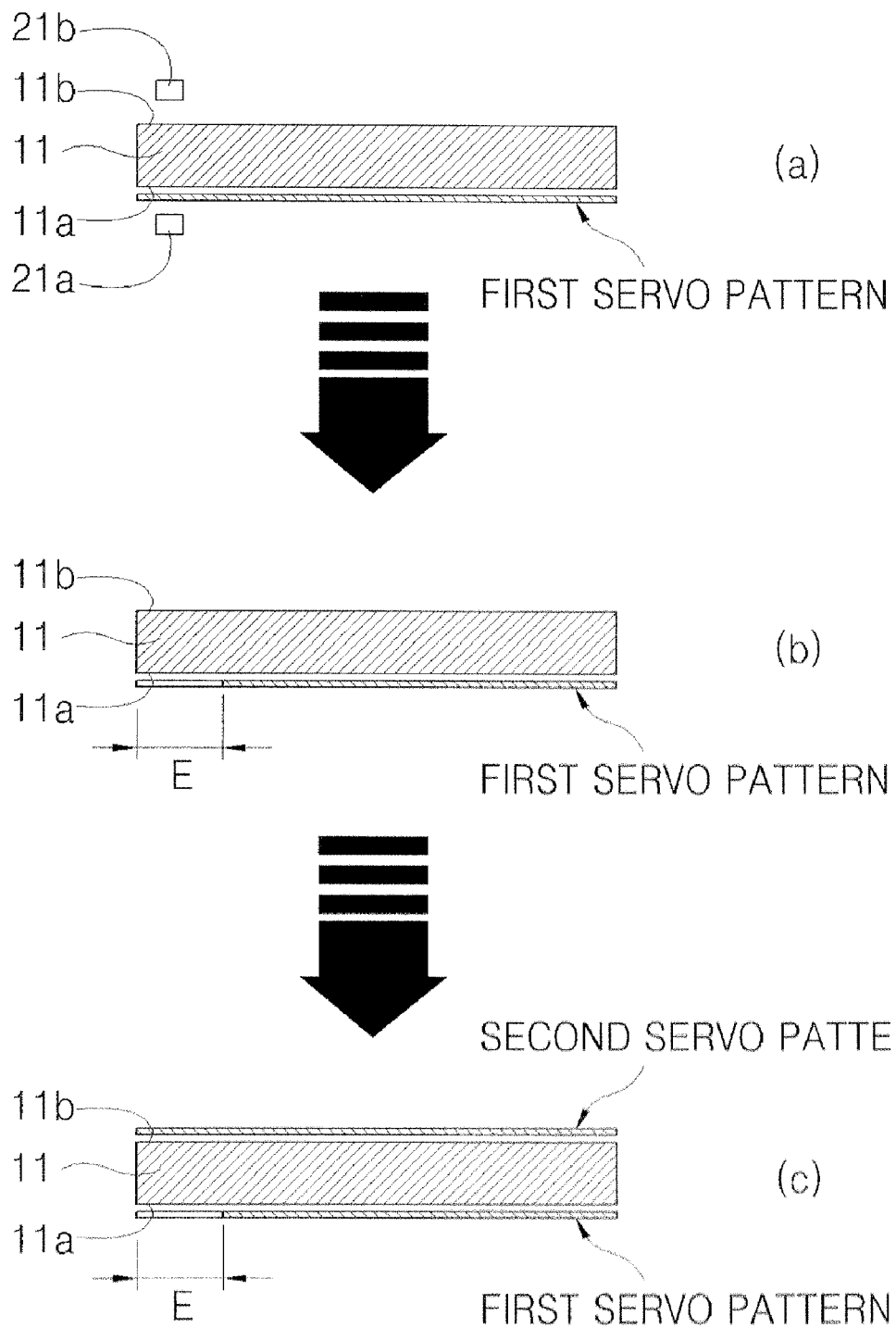
FIGS. 6(a) through 6(c) schematically illustrate a servo track writing method according to an embodiment of the present general inventive concept.
Figure 7:
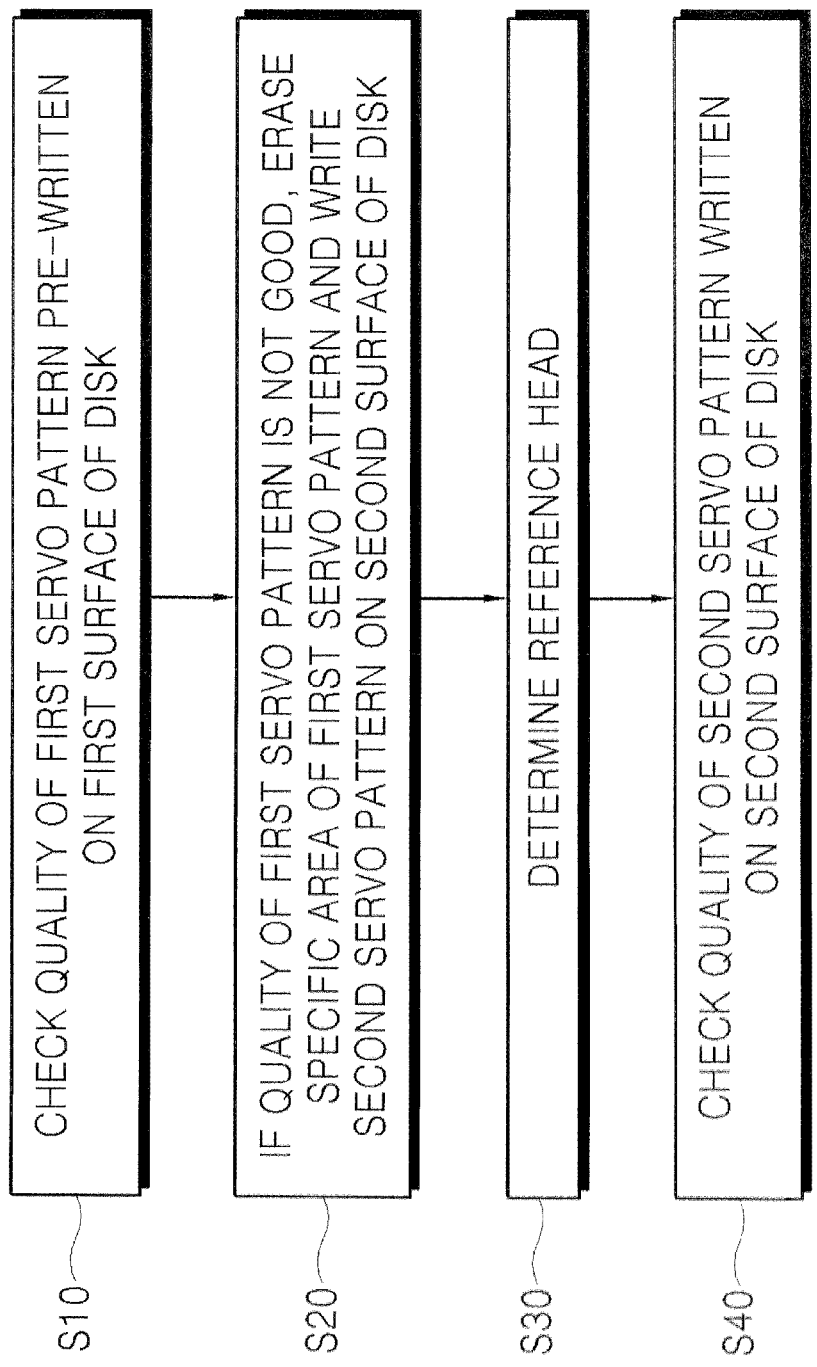
FIG. 7 is a flowchart illustrating a servo track writing method according to an embodiment of the present general inventive concept.
Figure 8:
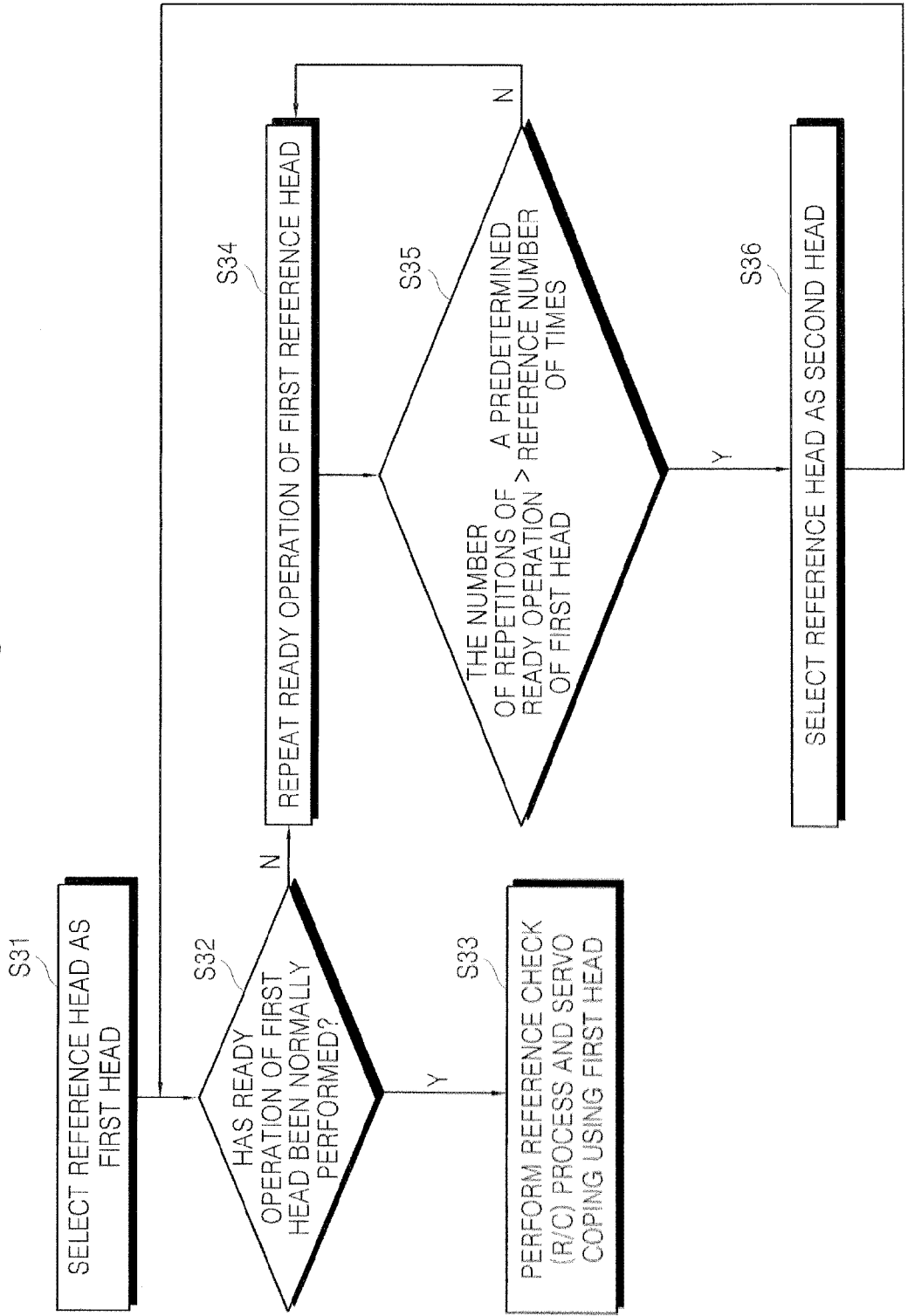
FIG. 8 is a flowchart illustrating operation S30 of the servo track writing method of FIG. 7, according to an embodiment of the present general inventive concept.

FIG. 7 is a flowchart of a servo track writing method according to an embodiment of the present general inventive concept. FIG. 8 is a flowchart of operation S30 of the servo track writing method of FIG. 7, according to an embodiment of the present general inventive concept. FIGS. 7 and 8 are described below in connection with FIGS. 6(a)-(c), which schematically illustrate a servo track writing method, as well as with the servo track write system illustrated in FIG. 5.

As will be described in detail later, the controller 42 (see, e.g., FIG. 5) of the HDD 1 is linked to a system controller 75 (see, e.g., FIG. 5) of the servo track write system to perform a servo track write along with the system controller 75.

A servo writer 70 (e.g., illustrated in FIG. 5) having PPTSTW is included with the above-described servo track write system to perform a servo track write.

The servo writer 70 includes a push pin (not illustrated) whose end is attached to a master actuator arm (not illustrated) and whose other end extends to the HDD 1 through a servo write slot, in order to perform the servo track write.

As previously described, servo patterns are pre-written on the disk 11 of the HDD 1, which is connected to the servo writer 70 using the PPTSTW, using, for example, offline servo track write (OLSTW).

For reference, servo patterns are divided into OGB patterns of patterns as described with reference to FIG. 4 and spiral patterns. Hereinafter, the OGB patterns and the spiral patterns are referred to as servo patterns.

As illustrated in FIG. 6(a), a servo pattern is typically written on a first surface 11a, which is a lower surface of the disk 11, during the OLSTW. Alternatively, the servo pattern may be written on an upper surface of the disk 11 during the OLSTW.

For reference, the servo pattern, which is pre-written on the first surface 11a of the disk 11 by the OLSTW, will be referred to as a first servo pattern, and an upper surface of the disk 11 will be referred to as a second surface 11b.

The disk 11, on which the first servo pattern is pre-written by the OLSTW, is assembled with the HDD 1 illustrated in FIG. 1. An R/C process is performed on the disk 11 based on a reference head.

Turning again to FIG. 7, in operation S10, a quality of the first servo pattern is checked through the R/C process. If the quality of the first servo pattern is good as determined by the R/C process, the first servo pattern is copied onto the second surface 11b which is the upper surface of the disk 11. Here, the first servo pattern may be copied using self-servo copying, but is not limited thereto.

For example, the R/C process may determine the quality of the first servo pattern, and compare the determined quality with a predefined quality level. If the determined quality level is equal to or greater than the predefined quality level, the R/C process may determine that the quality of the first servo pattern is good.

If the quality of the first servo pattern is not good as determined by the R/C process, the system controller 75 performs a new servo track write in a rework process. For example, the R/C process may determine the quality of the first servo pattern, and compare the determined quality with a predefined quality level. If the determined quality level is less than the predefined quality level, the R/C process may determine that the quality of the first servo pattern is not good.

In more detail, if the first servo pattern is not good as determined by the R/C process, in operation S20, the system controller 75 erases a specific area E of the first servo pattern as illustrated in FIG. 6(b) and writes a second servo pattern on the second surface 11b of the disk 11 as illustrated in FIG. 6(c).

For example, the R/C process that determines that the first servo pattern is not good may indicate that a first head 21a corresponding to the first surface 11a of the disk 11 does not seek and follow a corresponding track, or an error frequently occurs.

As described above, in the conventional servo track write, a whole area of a first servo pattern, which is not good, is erased, and a new servo pattern is written. However, in the present exemplary embodiment, instead of erasing a whole area of the first servo patterns, only the specific area E of the first servo pattern is erased. By performing an erasing the specific area E of the first servo pattern, the first servo pattern is thus treated as being defective.

In this case, the erased specific area E may substantially include, or, alternatively, may not include a defect servo pattern which is a defect factor.

The specific area E which is erased from the first servo pattern may be positioned in any area of the first surface 11a of the disk 11. If the first head 21a is ready in an outer diameter (OD) area of the first surface 11a of the disk 11, the specific area E is positioned in the OD area of the first surface 11a of the disk 11. However, the present general inventive concept is not limited thereto, and thus the specific area E may be positioned in a middle diameter (MD) area or an inner diameter (ID) area of the disk 11.

Thereafter, the system controller 75 controls the servo writer 70 using the PPSTW to write the second servo pattern on the second surface 11b, which is the upper surface of the disk 11. Here, the second servo pattern is newly written throughout the second surface 11b of the disk 11.

After the second servo pattern is completely written, the system controller 75 checks a quality of the second servo pattern. In operation S30 illustrated generally in FIG. 7 and in greater detail in FIG. 8, a reference head is determined to sense the second servo pattern so as to check the quality of the second servo patterns.

The reference head is determined according to operations of FIG. 8. Referring to FIG. 8, in operation S31, one of first and second heads 21a and 21b respectively corresponding to the first and second surfaces 11a and 11b of the disk 11 (e.g., as illustrated in FIGS. 6(a)-6(c)) is selected as a first reference head.

If the disk 11 is in a normal state, only the first servo pattern is written on the first surface 11a, which is the lower surface of the disk 11, using the OLSTW. Thus, the first reference head is selected as the first head 21a.

In operation S32, a determination is made as to whether a ready operation of the first head 21a has been normally performed using the first head 21a which is selected to check the first servo pattern. For example, a ready operation may be determined to be normally performed if the ready operation has been performed a number of times that is equal to or greater than a predefined number of times over a predefined time period. As previously described, the ready operation of the first head 21a refers to track seeking or track following which is performed by the first head 21a.

If it is determined in operation S32 that the ready operation of the first head 21a has been normally performed, an R/C process and servo coping are performed using the first head 21a in operation S33.

However, if it is determined in operation S32 that the first servo pattern is not good in the R/C process as described above, the specific area E of the first servo pattern is erased. Thus, the ready operation of the first head 21a is not normally performed. If it is determined in operation S32 that the ready operation of the first head 21a has not been normally performed, the ready operation of the first head 21a is repeated the predetermined reference number of times in operation S34 in order to further accurately determine a reference head in operation.

In operation S35, a determination is made as to whether the number of repetitions of the ready operation of the first head 21a exceeds the predetermined reference number of times, e.g., about 8 times. If it is determined in operation S35 that the number of repetitions of the ready operation of the first head 21a exceeds the predetermined reference number of times, the second head 21b of the first and second heads 21a and 21b is selected as a second reference head in operation S36.

A ready operation of the selected second head 21b may be performed using the same method as that by which the ready operation of the first head 21a has been performed. If the ready operation of the second head 21b is normally performed, the second head 21b is determined as a final reference head.

After the reference head is determined as described above, the system controller 75 checks the quality of the second servo pattern through the R/C process based on the reference head. If the quality of the second servo pattern is good, the system controller 75 copies the second servo pattern onto the first surface 11a of the disk 11. Here, the others of the first servo pattern, which are pre-written on the first surface 11a, are neglected or covered with the second servo pattern. However, if the quality of the second servo pattern is not good, a whole portion of the second servo pattern is erased, and a new servo pattern is written on the second surface 11b of the disk 11.

A series of operations of the servo writing method performed by the system controller 75 will now be described in more detail with reference to FIG. 7.

The HDD 1 is connected to the servo writer 70 which uses the PPSTW.

Next, the R/C process is performed. In operation S10, the quality of the first servo pattern written on the first surface 11a of the disk 11 is checked through the R/C process based on the reference head determined as the first head 21a.

If the quality of the first servo pattern is good, the first servo pattern is copied onto the second surface 11b of the disk 11 based on the first head 21a.

If the quality of the first servo pattern is not good, the specific area E of the first servo pattern is erased, and the second servo pattern is written on the second surface 11b of the disk 11 in operation S20.

In operation S30, the newly written second servo pattern is sensed on a code to determine a reference head, wherein the quality of the second servo pattern is checked based on the reference head.

After the reference head is determined as in operations S31 through S36 of FIG. 8, the quality of the newly written second servo pattern is checked through the R/C process based on the second head 21b which is the reference head.

If the quality of the second servo pattern is good, the second servo pattern is copied onto the first surface 11a of the disk 11. Here, the others of the first servo pattern, which are pre-written on the first surface 11a, are neglected or covered with the second servo pattern.

If the quality of the second servo pattern is not good, the whole portion of the second servo pattern is erased, and a new servo pattern is written on the second surface 11b of the disk 11. Since this corresponds to a case where servo patterns copied onto the second surface 11b of the disk 11 are erased, the second servo pattern may be rapidly erased using a magnet eraser.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, in a servo track writing method and a servo track write system of a HDD using the servo track write method according to the present general inventive concept, process time delay factors of a series of rework processes of writing servo patterns on a disk are removed to shorten a process time of the rework processes. In addition, productivity of the HDD is improved.

In the above-described embodiments of the present general inventive concept, servo track write is performed on one disk but may be simultaneously performed on a plurality of disks.

While the present general inventive concept has been particularly illustrated and described with reference to exemplary embodiments thereof, it will be understood by those of ordinary skill in the art that various changes in form and details may be made therein without departing from the spirit and scope of the present general inventive concept as defined by the following claims.

What is claimed is:

1. A servo track writing method, comprising:
   performing a reference check (R/C) on a first servo pattern which is pre-written on a first surface of a disk; and
   if the performed R/C determines that a quality of the first servo pattern is not good, erasing a specific area of the first servo pattern and writing a second servo pattern on a second surface of the disk.

2. The servo track writing method of claim 1, further comprising determining a reference head to be a reference for a R/C performed on the second servo patterns.

3. The servo track writing method of claim 2, wherein the determining the reference head comprises:
   selecting a first head of first and second heads corresponding to the first surface of the disk as a first reference head;
   performing a ready operation of the first reference head; and
   determining a final reference head based at least in part on whether the ready operation of the first reference head is normally performed.

4. The servo track writing method of claim 3, wherein the determining the reference head further comprises:
   repeating the ready operation of the first reference head a predetermined reference number of times if the ready operation of the first reference head is not normally performed.

5. The servo track writing method of claim 4, wherein the determining the reference head further comprises:
   if the number of repetitions of the ready operation of the first reference head exceeds the predetermined reference number of times, selecting the second head as a second reference head and performing a ready operation of the second reference head.

6. The servo track writing method of claim 2, further comprising performing a R/C on the servo pattern which is written on the second surface of the disk.

7. The servo track writing method of claim 6, wherein:
   if a quality of the second servo pattern is good as determined by the performed R/C, copying the second servo pattern onto the first surface of the disk; and
   if the quality of the second servo pattern is not good as determined by the performed R/C, erasing a portion of the second servo pattern and writing a new servo pattern on the second surface of the disk using a predetermined magnet eraser.

8. The servo track writing method of claim 1, wherein the second servo pattern is a servo pattern which is newly written throughout the second surface of the disk.

9. The servo track writing method of claim 1, wherein the first servo pattern is pre-written on a first surface of the disk using Offline Servo Track Write (OLSTW).

10. The servo track writing method of claim 1, wherein the specific area is a servo pattern which is positioned in an outer diameter (OD) area of the first surface of the disk.

11. A servo track write system of a hard disk drive (HDD), comprising:
    a servo writer connected to the HDD to pre-write a first servo pattern on a disk of the HDD; and
    a system controller to perform a reference check (R/C) on the first servo pattern, and, to erase a specific area of the first servo pattern and to write a second servo pattern on a second surface of the disk if the R/C check determines that the first servo pattern is not good.

12. The servo track write system of claim 11, wherein the system controller is to determine a reference head as a reference for the R/C to be performed on the second servo pattern.

13. The servo track write system of claim 12, wherein the system controller is to select a first head corresponding to the first surface of the disk as a first reference head from first and second heads, to perform a ready operation of the first reference head, and to determine a final reference head based on whether the ready operation of the first reference head is normally performed.

14. The servo track write system of claim 13, wherein if the ready operation of the first reference head is normally performed, the system controller is to repeat the ready operation of the first reference head a predetermined reference number of times.

15. The servo track write system of claim 14, wherein if the number of repetitions of the ready operation of the first reference head exceeds the predetermined reference number of times, the system controller is to select the second head as a second reference head and is to perform a ready operation on the second reference head.

16. The servo track write system of claim 12, wherein the system controller is to perform the R/C on the second servo pattern which is written on the second surface of the disk.

17. The servo track write system of claim 16, wherein:
    the system controller is to copy the second servo pattern onto the first surface of the disk if a quality of the second servo pattern is good and is to erase a portion of the second servo pattern and to write a new servo pattern on the second surface of the disk using a predetermined magnet eraser if the quality of the second servo pattern is not good.

18. The servo track write system of claim 11, wherein the second servo pattern to be written by the system controller is a servo pattern which is newly written throughout the second surface of the disk.

19. The servo track write system of claim 11, wherein:
    the first and second surfaces are respectively lower and upper surfaces of a disk;
    the system controller to write the first servo pattern on the first surface of the disk using OLSTW; and
    the servo writer is a Push Pin Type Servo Track Writer (PPTSTW).

20. The servo track write system of claim 11, wherein the specific area that is erased by the system controller is a servo pattern which is positioned in an OD area of the first surface of the disk.

21. A servo track writing method, comprising:
determining a quality of a first servo pattern pre-written on a first surface of a disk;
comparing the determined quality with a predefined quality level; and
erasing a specific area of the first servo pattern and writing a second servo pattern on a second surface of the disk if the determined quality is less than the predefined quality level.

22. The method of claim 21, further comprising:
determining a reference head; and
determining a quality of a second servo pattern written on the second surface of the disk.

23. A servo track write system of a hard disk drive (HDD), comprising:
a servo writer connected to the HDD to pre-write a first servo pattern on a disk of the HDD;
a system controller to determine a quality of the first servo pattern pre-written on a first surface of a disk, to compare the determined quality with a predefined quality level, and to erase a specific area of the first servo pattern and write a second servo pattern on a second surface of the disk if the determined quality is less than the predefined quality level.

24. The system of claim 23, wherein the system controller is to determine a reference head and determine a quality of a second servo pattern written on the second surface of the disk.

25. A non-transitory computer readable medium containing computer readable instructions, that when executed by a computer, perform a servo track writing method, the method comprising:
determining a quality of a first servo pattern pre-written on a first surface of a disk;
comparing the determined quality with a predefined quality level; and
erasing a specific area of the first servo pattern and writing a second servo pattern on a second surface of the disk if the determined quality is less than the predefined quality level.

26. A hard disk drive (HDD) apparatus, comprising:
at least one disk; and
a controller to control a received pre-write operation of a first servo pattern on the at least one disk, and to control an erase operation of a specific area of the first servo pattern and to control a write operation of a second servo pattern on a second surface of the at least one disk if a received quality determination of the pre-written first servo pattern is less than a predefined quality level.

27. A hard disk drive (HDD) system, comprising:
at least one disk;
a HDD controller to control a write operation of data on the at least one disk;
a servo writer connected to the HDD controller to pre-write a first servo pattern on the at least one disk; and
a system controller to determine a quality of the first servo pattern pre-written on a first surface of the at least one disk, to compare the determined quality with a predefined quality level, and to erase a specific area of the first servo pattern and write a second servo pattern on a second surface of the at least one disk if the determined quality is less than the predefined quality level.

* * * * *